April 7, 1970 G. T. McCLURE 3,504,950
BRAKE VALVE APPARATUS
Filed April 19, 1968 2 Sheets-Sheet 1

INVENTOR.
GLENN T. McCLURE
BY
*A. A. Steinmiller*
ATTORNEY

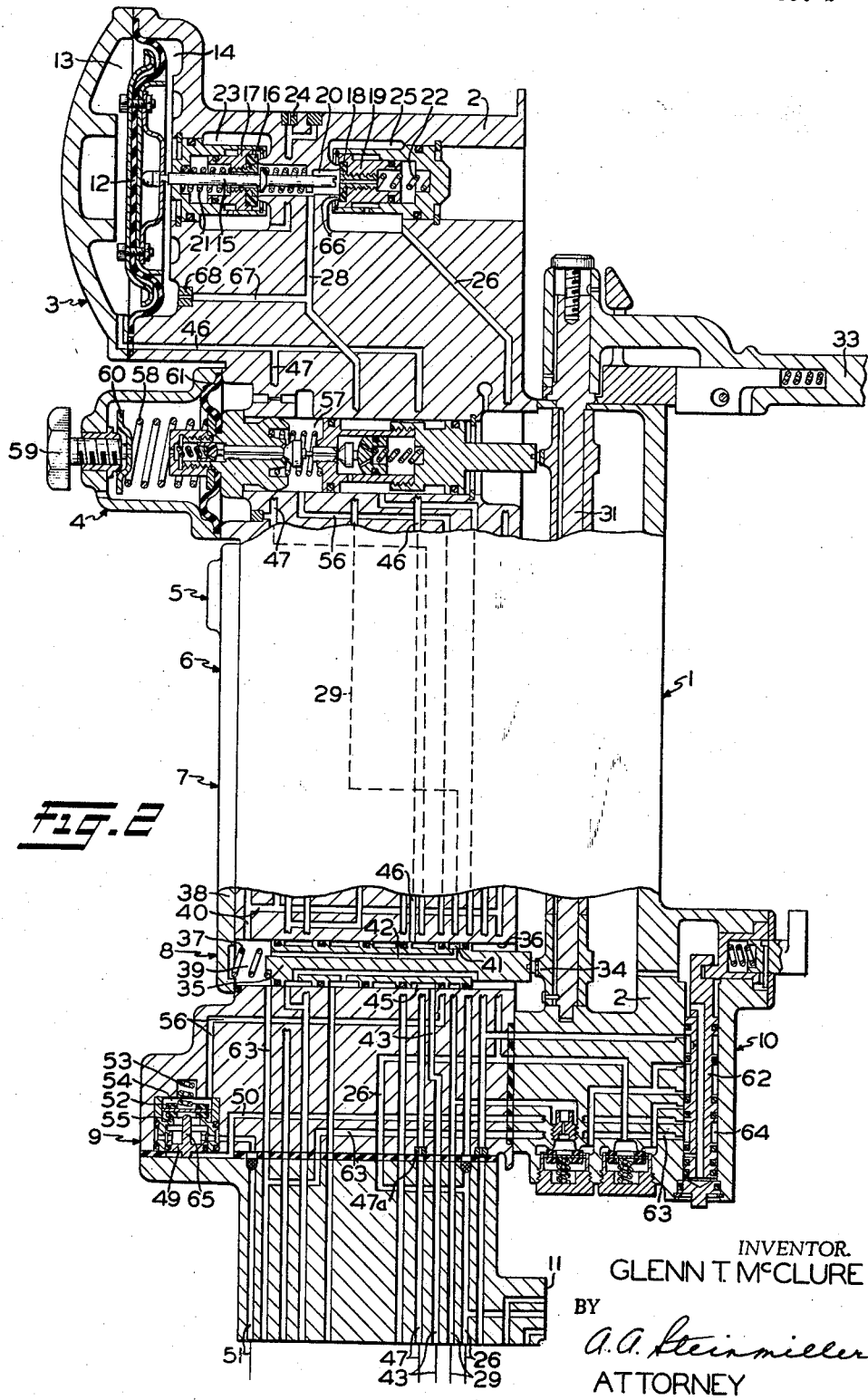

United States Patent Office 3,504,950
Patented Apr. 7, 1970

3,504,950
BRAKE VALVE APPARATUS
Glenn T. McClure, McKeesport, Pa., assignor to Westinghouse Air Brake Company, Wilmerding, Pa., a corporation of Pennsylvania
Filed Apr. 19, 1968, Ser. No. 722,748
Int. Cl. B60t 15/22, 17/06
U.S. Cl. 303—35                                    11 Claims

ABSTRACT OF THE DISCLOSURE

A relay type brake valve device, for controlling pressure variations in the brake pipe of a railway fluid pressure brake control system, having a multiposition suppression valve which, while in a brake release position, effects a momentary supply of fluid under pressure from a charged high pressure volume reservoir to the brake valve relay valve device thereby causing its operation to rapidly charge that portion of the train brake pipe extending from the locomotive through the first several cars in the train. This momentary rapid charging of the portion of the brake pipe on the first several cars in the train insures operation of the accelerated service release valve of the brake control valve device on these cars notwithstanding a prior limited degree of brake pipe pressure reduction which effected a light brake application on the train. In all other positions of the suppression valve, the volume reservoir is connected to the locomotive main reservoir to cause the charging thereof to the normal main reservoir pressure.

BACKGROUND OF THE INVENTION

Substantially all new freight cars built in the United States today are equipped with the familiar AB air brake control valve device upgraded to include an accelerated service release valve device operative, upon effecting a brake release subsequent to a service brake application, to cause substantial equalization of pressure between the fully charged emergency reservoir and the brake pipe thereby hastening the recharging of the brake pipe and the the complete release of the brakes on all cars in the train. However, when effecting a brake release subsequent to a minimum service brake application in which the pressure in the train brake pipe is reduced approximately eight (8) pounds per square inch, the corresponding amount of increase in the brake pipe pressure at the brake valve is dissipated or to some extent reduced in that portion of the train brake pipe extending from the locomotive through the first several cars in the train as the result of pipe friction and also the flow of the fluid through the brake pipe.

Accordingly, it is the general purpose of this invention to provide a novel engineer's brake valve device of the type having a relay valve device operative to cause charging of the train brake pipe from a main storage reservoir on the locomotive which brake valve device, while the brake valve handle occupies all of its handle positions except its release position, provides for charging a volume reservoir to the pressure present in the main reservoir on the locomotive, and which, while the brake valve handle occupies its release position, provides for connecting this charged volume reservoir to the equalizing reservoir and one side of an abutment that operates the relay valve device. The resulting equalization pressure between the charged volume reservoir and the equalizing reservoir operates the relay valve device to cause a build-up of pressure in the brake pipe at the locomotive that is somewhat higher than normal brake pipe pressure which build-up of pressure continues for a short duration of time. Consequently, a higher pressure than heretofore obtained prevails in the train brake pipe extending through the first several cars in the train, subsequent to the pressure drop resulting from overcoming pipe friction and causing flow of fluid under pressure through this portion of the train brake pipe, to insure proper operation of the accelerated service release valve device of the brake control valve device on each of these several cars adjacent the locomotive. This operation of the accelerated service release valve device on each of the several cars adjacent the locomotive provides an adequate supply of fluid under pressure from the emergency reservoir on each of these cars to the train brake pipe extending toward the last car in the train to insure that the pressure increase in this portion of the train brake pipe is sufficient to insure proper operation of the accelerated service release valve device on the remaining cars in the train. Therefore, a prompt release of the brakes on all cars in the train is obtained subsequent to effecting a minimum service brake application.

SUMMARY OF THE INVENTION

According to the present invention, a novel engineer's brake valve device constituting the present invention includes essentially the combination in a conventional No. 26 type brake valve device, such as is described and claimed in Patent No. 2,958,561, issued Nov. 1, 1960, to Harry C. May and assigned to the assignee of the present invention, of a volume reservoir and a multiposition suppression valve operated to its several positions in accordance with manipulation by the engineer of the handle of the brake valve device, to establish in all positions of the handle except release position, a communication through which the volume reservoir may be charged with fluid under pressure from the main reservoir on the locomotive, and to establish, in the release position of the handle, a communication between the charged volume reservoir and the equalizing reservoir which is connected to the side of an abutment that causes operation of the relay valve device of the brake valve device to effect charging of the train brake pipe and the supply of fluid under pressure to the other side of the abutment until substantially equal pressures are present on the respective opposite sides of the abutment in response to which the relay valve device is moved to its lap position thereby terminating charging of the train brake pipe.

In the accompanying drawings:

FIG. 2 is an enlarged diagrammatic view, partly in section, of the novel engineer's brake valve device shown in FIG. 1.

Figure 1:
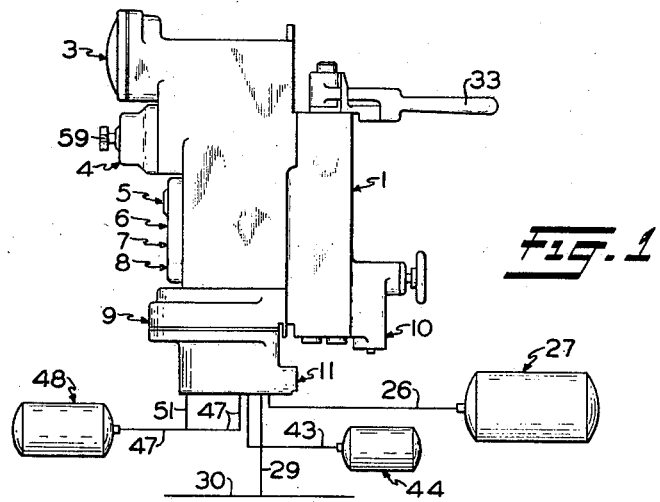
FIG. 1 is an outline view of a novel engineer's brake valve device connected by suitable pipes to the usual main reservoir, equalizing reservoir, and train brake pipe, and to a special high pressure volume reservoir.

Referring to FIG. 2 of the drawings, a novel engineer's automatic brake valve device 1 is shown which is in part similar in construction to the brake valve device shown and described in Patent No. 2,958,561, issued Nov. 1, 1960, to Harry C. May, and assigned to the assignee of the present application. but differing therefrom in respects hereinafter described. The brake valve device 1 comprises a sectionalized casing 2 containing a relay valve device 3, a self-lapping control valve device 4, a brake pipe cut-off valve device 5, a vent valve device 6, an emergency valve device 7, a novel suppression valve device 8, an equalizing reservoir cut-off valve device 9, and a manually positionable selector valve device 10 for selectively conditioning the brake valve device 1 for effecting either direct release operation of the brake control valve device on each car in a train of cars hauled by a locomotive provided with the engineer's brake valve device 1, if each car is provided with a direct release type brake control valve device, or a graduated application and graduated release operation of the brake control valve device on each car if each car is provided with a graduated release type brake control valve device, for cutting out control of brake pipe pressure by the brake valve device 1 for multiple unit or trailing (pusher) unit operation, or for conducting a brake pipe leakage test. The brake pipe cut-off valve device 5, the vent valve device 6, and the emergency valve device 7 form no part of the present invention and may be identical in construction to the corresponding devices shown in the above-mentioned Patent No. 2,958,561 and, therefore, are shown in outline in FIG. 2 of the drawings and will not be described in detail herein. An independent brake valve device (not shown) may be secured to a bolting face 11 formed on the sectionalized casing 2 by any suitable means (not shown) for permitting the fluid pressure brakes on the locomotive to be applied and released independently of those on the cars in the train.

The relay valve device 3 comprises a diaphragm-type piston 12 (FIG. 2), which is subject opposingly to fluid pressures in a chamber 13 and a chamber 14 and is adapted through the medium of a coaxially arranged operating stem 15 to effect unseating of a disc-shaped exhaust valve 16 carried by an annular valve member 17 or to effect unseating of a disc-shaped supply valve 18 carried by a coaxially arranged annular valve member 19, according to whether the pressure in chamber 13 is less than or exceeds the pressure in chamber 14. The operating stem 15 is coaxially connected to the chamber 14 side of the diaphragm-type piston 12 and projects centrally through the annular valve member 17 and a chamber 20 and is adapted to be moved into abutting relationship with the left-hand face of the supply valve 18. Springs 21 and 22 respectively urge the valve members 17 and 19 towards each other for normally concurrently seating the exhaust valve 16 and the supply valve 18. The exhaust valve 16 controls communication between the chamber 20 and a chamber 23 which is open to atmosphere via an exhaust choke 24, whereas supply valve 18 controls communication between the chamber 20 and a chamber 25 that is always open via a passageway and corresponding pipe 26 to a main reservoir 27 (FIG. 1).

The chamber 20 (FIG. 2) is connected via a passageway 28 to a chamber (not shown) in the brake pipe cut-off valve device 5. As is fully described in the hereinbefore-mentioned Patent No. 2,958,561, brake pipe cut-off valve device 5 comprises a valve (not shown) that controls communication from the above-mentioned chamber in this brake pipe cut-off valve device 5 to a second chamber (not shown) in this brake pipe cut-off valve device 5 which second chamber is connected via a passageway and corresponding pipe 29 to a brake pipe 30 (FIG. 1) that extends from the locomotive back through each car in the train.

According to the present invention, a cam shaft 31 (FIGS. 2 and 3) that is rotatably mounted in the sectionalized casing 2 and has secured to its upper end a manually movable brake valve handle 33, carries thereon four spaced-apart cams as shown and described in the above-mentioned patent.

Figure 3:
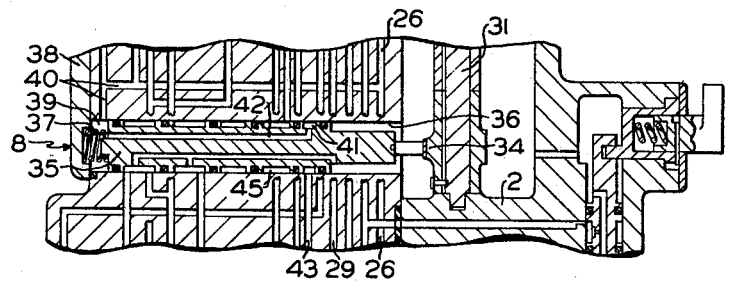
FIG. 3 is a diagrammatic view of the suppression valve of the brake valve device shown in FIG. 2 with the suppression valve in another one of its positions.

The lowermost of these four cams is denoted in FIGS. 2 and 3 of the drawings by the reference numeral 34 and controls operation of the hereinbefore-mentioned suppression valve device 8.

The suppression valve device 8 comprises a spool-type suppression valve 35 that is slidably disposed in a horizontal bore 36 formed in the sectionalized casing 2 and is constantly biased into contact with the cam 34 by a spring 37 interposed between its left-hand end and a side cover member 38 that is secured by any suitable means (not shown) to the left-hand side of the sectionalized casing 2 to close the left-hand end of the bore 36 therein. The side cover member 38 cooperates with the sectionalized casing 2 to form at the left-hand end of the suppression valve 35 a chamber 39 that is in constant communication with the main reservoir 27 via passageway 40 that at one end opens into the chamber 39 and at its opposite end opens into the passageway 26 which is connected by the correspondingly numbered pipe to the main reservoir 27, as hereinbefore stated.

Figure 4:
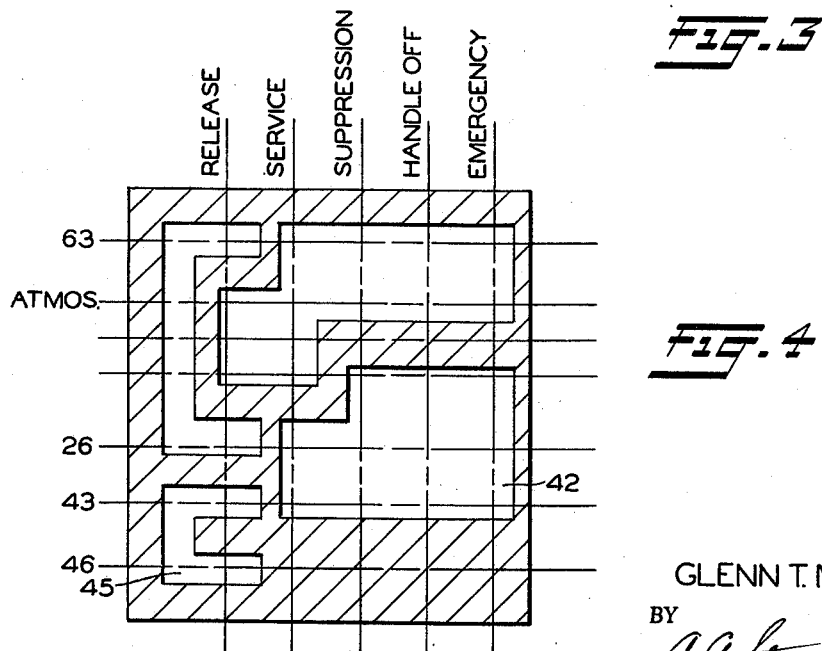
FIG. 4 is a diagrammatic view, showing in development form connections established by the suppression valve device of FIGS. 2 and 3 in different positions of the brake valve handle.

The contour of the above-mentioned cam 34 carried on the cam shaft 31 is such that the suppression valve 35 is moved to the position in the bore 36 in which it is shown in FIG. 2 upon manual movement of the brake valve handle 33 to its release position, and that the suppression valve 35 is moved to the position in the bore 36 in which it is shown in FIG. 3 upon manual arcuate movement of the handle 33 out of its release position and to any position in an application zone defined between its release position and a service position. It should be understood that the suppresson valve 35 is also operatively shifted by rotation of the shaft 31 and cam 34 to the additional positions identified diagrammatically in FIG. 4 as Suppression, Handle Off and Emergency positions. The control functions exercised by the suppression valve 35 in the last mentioned three positions are not essential to an understanding of the present invention, but reference may be had to the aforesaid Patent No. 2,958,561 for a detailed description of these control functions. Suffice it to say, the charging communication for the volume reservoir 44 from the main reservoir 27 via pipe and passageway 26 is maintained in all of the aforesaid handle position except release as shown in FIG. 4.

While the suppression valve 35 is maintained in the position shown in FIG. 3 by the cam 34, which position corresponds to the service position of the brake valve handle 33 (FIG. 1), a first elongated peripheral annular groove 41 thereon establishes a communication between that end of a first passageway 42 provided in the suppression valve 35 that opens at the peripheral surface of the groove 41 and that end of a passageway 43 provided in the sectionalized casing 2 that opens at the wall surface of the bore 36 therein at such a location intermediate the ends of this bore 36 as to be in alignment with the groove of the bore 36 therein at such a location intermediate the chamber 39, and the other end of the passageway 43 is connected by a correspondingly numbered pipe 43 (FIG. 1) to a high pressure volume reservoir 44. Accordingly, while the suppression valve 35 occupies the position shown in FIG. 3, the reservoir 44 is charged with fluid under pressure from the main reservoir 27 via the pipe and corresponding passageway 26, passageway 40, chamber 39, passageway 42 in and groove 41 on the suppression valve 35, and passageway and corresponding pipe 43 until the pressure in this volume reservoir 44 is substantially the same as that in the main reservoir 27 which is charged with fluid under pressure by the usual fluid compressor (not shown) carried on the locomotive. It should be understood that the above-mentioned volume reservoir charging communication is maintained in all positions of the suppression valve 35, and therefore in all positions of the brake valve handle 33, except the position of the suppression valve 35 corresponding to the release position of this handle 33 in which position this suppression valve is shown in FIG. 2.

Furthermore, while the suppression valve 35 occupies the position in which it is shown in FIG. 2, which position corresponds to the release (i.e., running) position of the brake valve handle 33, a second elongated peripheral annular groove 45 thereon is effective to establish a communication between that end of the hereinbefore-mentioned passageway 43 that opens at the wall surface of the bore 36 and one end of a passageway 46 provided in the sectionalized casing 2 which one end also opens at the wall surface of this bore 36 at a location above and at the left-hand side of the location at which the passageway 43 opens at the wall surface of this bore.

The passageway 46 extends through the sectionalized casing 2 and at its opposite end opens into the hereinbefore-mentioned chamber 13 in the relay valve device 3 at the left-hand side of the diaphragm-type piston 12. Opening into this passageway 46 adjacent the end thereof that opens into the chamber 13 is one end of a passageway 47 having a choke 47a therein. This passageway 47 extends through the sectionalized casing 2 and is connected by a corresponding pipe to an equalizing reservoir 48 (FIG. 1) that is charged with fluid under pressure by operation of the self-lapping control valve device 4 under the control of the equalizing reservoir cut-off valve device 9 and a brake application valve device (not shown) in the manner explained in hereinbefore-mentioned Patent No. 2,958,561, the construction of this brake application valve device being also shown in detail in this patent. Accordingly, while the suppression valve 35 occupies the position shown in FIG. 2, which corresponds to the release position of the brake valve handle 33, the volume reservoir 44 (FIG. 1), which has been charged to substantially the same high pressure as that carried in the main reservoir 27, is connected to the chamber 13 (FIG. 2) at the left-hand side of the diaphragm-type piston 12 via pipe and corresponding passageway 43, groove 45 on suppression valve 35, and the passageway 46, and also to the equalizing reservoir 48 (FIG. 1) which is connected, as hereinbefore explained, by the pipe and corresponding passageway 47 to the passageway 46.

The equalizing reservoir cut-off valve device 9 (FIG. 2) comprises a piston 49, subject opposingly to fluid pressures in a passageway 50 and in a passageway 51 connected by a correspondingly numbered pipe to the pipe 47 (FIG. 1) intermediate the ends thereof. The valve device 9 further comprises a flat disc-type valve 52 (FIG. 2) subject on its lower side to the pressure in the passageway 51 and equalizing reservoir 48 and on its upper side to the bias of a spring 53 disposed in a chamber 54 formed in the sectionalized casing 2 and interposed between this casing and the valve 52. This spring 53 is effective to urge the valve 52 toward a valve seat 55 to close communication between the passageway 51 that is connected to the equilizing reservoir 48 and the chamber 54 which is connected by a passageway 56 to a delivery chamber 57 of the hereinbefore-mentioned self-lapping control valve device 4 the construction and operation of which is similar to that of the corresponding self-lapping control valve device 14 shown in the above-mentioned Patent No. 2,958,561.

The construction and operation of the selector valve device 10 is the same as that of the corresponding selector valve device 6 shown in Patent No. 2,958,561. Hence, a detailed description of the selector valve device 10 is not believed necessary herein since reference may be had to this patent for an understanding of the selector valve device 10 which forms no part of the present invention.

It will be understood that, except as pointed out above, the engineer's brake valve device 1 is the same in construction and operation as the engineer's brake valve device shown and described in Patent No. 2,958,561, issued to Harry C. May. Therefore, a second passageway extending through the suppression valve 35 and three spaced-apart peripheral annular grooves formed thereon on the left-hand side of the groove 45, as shown in FIGS. 2 and 3 of the drawings, serve the same purpose as the passageway and corresponding grooves of the suppression valve of the brake valve device shown in Patent No. 2,958,561.

Let it be supposed that a locomotive is provided with the brake control apparatus shown in FIG. 1 of the drawings and that this locomotive is coupled to a train of cars each of which is provided with the familiar AB air brake control valve device upgraded to include an accelerated service release valve device. Let it be further supposed that the main reservoir 27 shown in FIG. 1 is charged with fluid under pressure from the usual fluid compressor on the locomotive to a chosen value which, for example, may be one hundred and forty pounds per square inch.

In order to initially effect charging of the brake pipe 30 that extends from the locomotive back through each car in the train and the brake equipment on each of these cars, the locomotive engineer will manually move the handle 33 of the brake valve device 1 to its release (i.e., running position).

It may be assumed that the force of a regulating spring 58 (FIG. 2) of the self-lapping control valve device 4 may be manually adjusted by means of an adjusting screw 59 that adjusts the position of a spring seat 60 so as to preload a diaphragm-type piston 61 to a degree corresponding to the desired normal full charged value of the equalizing reservoir 48 and therefore, the brake pipe, as will be understood by those skilled in the art. Therefore, the self-lapping control valve device 4 will provide in its delivery chamber 57 a desired normal pressure, which, for example, may be seventy pounds per square inch.

While a spool-type valve 62 of the selector device 10 occupies its freight position in which it is shown in FIG. 2, fluid under pressure flows from the main reservoir 27 (FIG. 1) to the lower face of the piston 49 (FIG. 2) of the equalizing reservoir cut-off valve device 9 via pipe and passageway 26, passageway 40, chamber 39, a passageway 63 in the sectionalized casing 2, a peripheral annular groove 64 formed on the spool-type valve 62, and the hereinbefore-mentioned passageway 50. Fluid under pressure thus applied from the main reservoir 27 to the lower face of the piston 49 is effective to move this piston upward and, via a stem 65 integral therewith, unseat the valve 52 from its seat 55 against the yielding resistance of the spring 53.

With the valve 52 unseated, the fluid under pressure in the delivery chamber 57 of the self-lapping control valve device 4 will flow from this chamber 57 to the equalizing reservoir 48 via the passageway 56, chamber 54, past the unseated valve 52, pasageway and corresponding pipe 51 and pipe 47 until this equalizing reservoir is charged to the desired normal pressure which, for example, may be seventy pounds per square inch, as stated above.

Fluid under pressure thus supplied to the equalizing reservoir 48 (FIG. 1) flows therefrom to the chamber 13 (FIG. 2) of the relay valve device 3 of the brake valve device 1 via pipe and corresponding passageway 47, choke 47a and passageway 46. This fluid under pressure acting in the chamber 13 is effective to deflect the piston 12 in the direction of the right hand to shift the operating stem 15 in the same direction and cause unseating of the supply valve 18 from a valve seat 66.

When the supply valve 18 is thus unseated from its seat 66, fluid under pressure will flow from the main reservoir 27 to the brake pipe 30 via pipe and corresponding passageway 26, chamber 25, past unseated valve 18, chamber 20, passageway 28, brake pipe cut-off valve device 5, and passageway and corresponding pipe 29. As shown in FIG. 2, the passageway 28 is connected to the chamber 14 via a passageway 67 and a choke 68. Consequently, part of the fluid under pressure supplied to the passageway 28 will flow to the chamber 14 via the passageway 67 and choke 68, until the pressure in chamber 14 is increased to substantially the value of the equalizing reservoir pressure provided in the chamber 13, whereupon the piston 12 will be shifted in the direction of the left hand to a lap position in which it is shown in FIG. 2. As the piston 12 is thus shifted to its lap position, the spring 22 is rendered effective to move the supply valve 18 into seating contact with its seat 66 to cut off further flow of fluid under pressure from the main reservoir 27 to the chamber 14 and the brake pipe 30. Thus, the brake pipe 30 will be charged to a normal charged value which corresponds to the normal charged value of the pressure carried in the equalizing reservoir 48 as determined by the force of the spring 58 acting on the piston 61 which force is in accordance with the manual adjustment of screw 59, as hereinbefore explained.

It should be noted that the fluid under pressure supplied to the equalizing reservoir 48 and the chamber 13 by the self-lapping control valve device 4 in the manner explained above also flows to the volume reservoir 44 via the passageway 46, groove 45 on the suppression valve 35, which is now in its release position in which it is shown in FIG. 2, and passageway and corresponding pipe 43. Consequently, the volume reservoir 44 is initially charged to the same pressure as the equalizing reservoir 48 and the brake pipe 30 which pressure may be, for example, seventy pounds per square inch, as hereinbefore stated.

Subsequent to coupling a locomotive to a train of cars and prior to moving the train, the Interstate Commerce Commission requires that, after the train brake pipe and the brake equipment on all the cars in the train is charged to the normal pressure carried in the brake pipe, which pressure, for example, may be seventy pounds per square inch, the brakes on each car in the train must apply upon effecting a reduction of pressure in the brake pipe of twenty pounds per square inch. Consequently, before moving the train, the engineer will move the brake valve handle 33 arcuately out of its release position and to a position in its application zone corresponding to service position, it being understood that upon movement of the handle 33 to its service position, subsequent to charging the train brake pipe to the above-mentioned normal pressure of seventy pounds per square inch, the pressure in the train brake pipe will be reduced twenty pounds per square inch by operation of the relay valve device 3 in the usual manner.

As the brake valve handle 33 is manually moved arcuately from its release position to its service position, the cam shaft 31 and cam 34 are rotated therewith. The contour of the cam 34 is such that this rotation thereof is effective to move the suppression valve 35 against the bias of the spring 37 from the position in which this valve 35 is shown in FIG. 2 to the position in which it is shown in FIG. 3.

While the suppression valve 35 occupies the position shown in FIG. 3, which corresponds to the service position of the handle 33, fluid under pressure may flow from the main reservoir 27 (FIG. 1) to the volume reservoir 44 via the pipe and corresponding passageway 26, passageway 40 (FIG. 3), chamber 39, passageway 42 in and groove 41 on suppression valve 25, and passageway and corresponding pipe 43 until this reservoir 44 is charged to the same pressure as is carried in the main reservoir 27 which, for example, may be one hundred and forty pounds per square inch.

While the above-described brake application is in effect, an inspector walks the length of the train to observe that the brakes on each car in the train are applied. After it has been determined that the brakes on each car in the train are applied, the engineer effects a brake release on all cars in the train by arcuately moving the brake valve handle 33 from its service position through its application zone back to its release position.

From the foregoing, it is apparent that as the handle 33 is arcuately moved from its service position to its release position, the cam 34 effects movement of the suppression valve 35 from the position shown in FIG. 3 to the position shown in FIG. 2. Upon the return of the suppression valve 35 to the position shown in FIG. 2, the volume reservoir 44 (FIG. 1), which has been previously charged to the pressure carried in the main reservoir 27 that may be, as aforesaid, one hundred and forty pounds per square inch, is connected to the chamber 13 (FIG. 2) of the relay valve device 3 via pipe and corresponding passageway 43, groove 45 on suppression valve 35, and passageway 46. This supply of high pressure fluid to the chamber 13 will effect unseating of the supply valve 18 from its seat 66 to cause flow of fluid under pressure from the main reservoir 27 to the chamber 14 in the relay valve device 3 and to the train brake pipe 30 in the manner hereinbefore explained.

Some of the high pressure fluid supplied from the volume reservoir 44 to the passageway 46 and the chamber 13 will flow from the passageway 46 to the delivery chamber 57 in the self-lapping control valve device 4 via the passageway and corresponding pipe 47, pipe and corresponding passageway 51, past now unseated valve 52, chamber 54, and passageway 56.

It will be remembered that the self-lapping control valve device 4 has been adjusted to provide in its delivery chamber 57 a chosen pressure which may be, for example, seventy pounds per square inch. Consequently, upon the supply of a pressure of, for example, one hundred and forty pounds per square inch from the volume reservoir 44 to the delivery chamber 57 of the self-lapping control valve device 4 in which chamber 57 the pressure may be, for example, seventy pounds per square inch as aforesaid, the control valve device 4 will operate in the well-known manner of self-lapping valve devices to vent fluid under pressure from the delivery chamber 57 to atmosphere to maintain in the delivery chamber 57 a pressure which, as stated above, may be, for example, seventy pounds per square inch.

From the foregoing, it is apparent that the relay valve device 3 is operated by the high pressure fluid supplied thereto from the volume reservoir 44 to effect the supply of fluid under pressure from the main reservoir 27 to the train brake pipe 30 and the chamber 14 in this relay valve device simultaneously as the self-lapping control valve device 4 operates to vent to atmosphere the high pressure fluid supplied from the volume reservoir 44 to (1) the chamber 13 in the relay valve device 3, (2) the equalizing reservoir 48, and (3) the delivery chamber 57 in the control valve device 4 until the pressures in the chambers 13 and 14 on the opposite sides of the piston 12 are substantially equal and are the same as the pressure in the chamber 57 which may be seventy pounds per square inch, whereupon the spring 22 effects seating of supply valve 18 on its seat 66 so that flow of fluid under pressure from the main reservoir 27 to the chamber 14 and the train brake pipe 30 is cut off, it being understood that the relay valve device 3 is now in its lap position.

In other words, when the brake valve handle 33 is returned to its release position from its service position, or from any one of its several other positions, fluid at a high pressure is supplied from the volume reservoir 44 to the chamber 13 in the relay valve device 3, the equalizing reservoir 48, and the delivery chamber 57 in the self-lapping control valve device 4 to cause the relay valve device 3 to operate to supply fluid under pressure from the main reservoir 27 to the train brake pipe 30 to effect the charging thereof to the normal pressure carried in the equalizing reservoir 48 which, for example, may be seventy pounds per square inch, this normal pressure being obtained upon the self-lapping control valve device 4 blowing down or venting to atmosphere the equalization pressure in chamber 13 in the relay valve device 3, the equalizing reservoir 48 and the volume reservoir 44 until the pressure in this chamber and these reservoirs is reduced to seventy pounds per square inch as determined by the previous preloading of the piston 61 of the self-lapping control valve device 4 in the manner hereinbefore explained.

As fluid under pressure is supplied from the main reservoir 27 on the locomotive to the train brake pipe 30 extending from the locomotive to the last car in the train in the manner just explained, fluid under pressure will flow from that portion of the train brake pipe extending from the locomotive through the first several cars to the upgraded AB brake control valve device on each of these first several cars. This supply of fluid under pressure to the upgraded AB brake control valve device on each of these first several cars in a train is effective to cause operation of the corresponding accelerated service release valve device, which constitutes a part of each upgraded AB brake control valve device, to effect the supply of fluid under pressure from the fully charged emergency reservoir on each respective car to that portion of the train brake pipe extending through these several cars until equalization of pressure occurs between the respective emergency reservoirs on these cars and the train brake pipe. The fluid under pressure supplied from the emergency reservoirs on the first several cars in the train to the train brake pipe extending through these several cars, together with the fluid under pressure supplied by the brake valve device 1 to this portion of the train brake pipe, flows therefrom to the remaining portion of the train brake pipe to cause the accelerated service release valve devices on the remaining cars in the train to be operated in the manner described above. Accordingly, it is apparent that a quick recharge of the train brake pipe and a corresponding quick release of the brakes on all the cars in the train is obtained.

The engineer may now start the train on its journey to the next terminal or station.

Let it be supposed that after the train has traveled some distance from its starting point, it must descend a very slight grade that requires that the engineer effect a minimum service brake application. Accordingly, the engineer will move the brake valve handle 33 arcuately out of its release position and to a position in its application zone corresponding to a minimum reduction of pressure, for example, eight pounds per square inch, in the train brake pipe 30. Therefore, the self-lapping control valve device 4 will now operate in the usual manner to effect a reduction in the pressure in the equalizing reservoir 48 and the chamber 13 in the relay valve device 3 of eight pounds per square inch. This minimum reduction of the pressure in the chamber 13 of eight pounds per square inch causes the relay valve device 3 to operate to effect a corresponding reduction of the pressure in the chamber 14 and the train brake pipe 30 of eight pounds per square inch. The aforementioned upgraded AB brake control valve devices on the cars in the train operate in response to this minimum reduction in train brake pressure to effect a minimum service brake application on the train of cars.

Assuming a normal fully charged train brake pipe pressure of seventy pounds per square inch prior to effecting a minimum service brake application, it will be apparent that the reduced train brake pipe pressure, while the minimum service brake application is in effect, is substantially sixty-two pounds per square inch. Likewise, the reduced pressure in the chambers 13 and 14 and equalizing reservoir 48 is sixty-two pounds per square inch.

It will be understood that when the brake valve handle 33 was moved to the position in its application zone to effect the above-described minimum service brake application, the suppression valve 35 was moved to the position shown in FIG. 3 of the drawings to cause the volume reservoir 44 to be charged in the manner hereinbefore described with fluid under pressure from the main reservoir 27 until the pressure in the volume reservoir 44 is the same as that in main reservoir 27, which pressure may be, for example, one hundred and forth pounds per square inch, as hereinbefore stated.

To release the above-described minimum service brake application, when the train has reached the bottom of the grade, the engineer will return the brake valve handle 33 arcuately from the position it occupies in its application zone to its release position. This return of the handle 33 to its release position causes the cam 34 to return the suppression valve 35 from the position shown in FIG. 3 to the position shown in FIG. 2.

Upon return of the suppression valve 35 to the position shown in FIG. 2, which corresponds to the release position of the handle 33, the volume reservoir 44, that has been previously charged to the pressure carried in the main reservoir 27, which pressure may be, for example, one hundred and forty pounds per square inch, is connected via pathways hereinbefore described to the equalizing reservoir 48, the chamber 13 in the relay valve device 3, and the chamber 57 in the self-lapping control valve device 4 whereupon this valve device 4 operates to reduce the resulting equalization pressure to a value corresponding to the preloading of the piston 61, which value, as hereinbefore stated, may be, for example, seventy pounds per square inch.

The reduced pressure in the chamber 14 of the relay valve device 3, as hereinbefore stated, is sixth-two pounds per square inch at the time the suppression valve 35 is returned to the position shown in FIG. 2 to establish a communication between the volume reservoir 44 and the chamber 13 in this valve device 3. Since the volume reservoir 44 has been previously charged to the pressure carried in the main reservoir 27 which may be, for example, on hundred and forty pounds per square inch, it is apparent that when the communication between the volume reservoir 44 and the chamber 13 is first established, a substantial differential of pressure is established on the piston 12 of the relay valve device 3 whereas, if the volume reservoir 44 were not used, this differential of pressure on piston 12 would never exceed eight pounds per square inch.

It will be appreciated that a certain length of time will be required for the self-lapping control valve device 4 to reduce the pressure in the chamber 13 resulting from the equalization of pressure of one hundred and forty pounds per square inch in the volume reservoir 44 and the pressure of sixty-two pounds per square inch in the chamber 13 and the equalizing reservoir 48, and that during this time the piston 12 is subject to a substantial but constantly diminishing pressure differential that is effective to cause the relay valve device 3 to operate to effect the supply of fluid under pressure from the main reservoir 27 to the train brake pipe 30 and the chamber 14 at the right-hand side of the piston 12. It will be apparent that subjecting the piston 12 to this substantial but constantly diminishing pressure differential for the above-mentioned certain length of time required for the self-lapping control valve device 4 to reduce or blow down the pressure in the chamber 13 on the left-hand side of the piston 12 to a value corresponding to the preloading of the piston 61 of this valve device 4, which value may be, for example, seventy pounds per square inch, is effective to cause the relay valve device 3 to increase the pressure in that portion of the train brake pipe extending through the first several cars in the train adjacent the locomotive to a higher value than would be the case if the pressure in the chamber 13 were increased from sixty-two pounds per square inch to seventy pounds per square inch to thereby establish a pressure differential of only eight pounds per square inch on the piston 12 as has heretofore been the case when effecting a brake release subsequent to effecting a minimum service brake application on the train.

By thus increasing the pressure in that portion of the train brake pipe extending through the first several cars in the train to a value higher than that previously obtained by using heretofore known engineer's brake valve devices, the operation of the accelerated service release valve of the brake control valve device on each of these first several cars is positively insured notwithstanding dissipation or reduction of pressure in this portion of the train brake pipe as the result of pipe friction and also the flow of the fluid toward the last car in the train. This operation of the accelerated service release valve of the brake control valve device on each of these first several cars in the train effects the supply of fluid under pressure from the fully charged emergency reservoir on each respective one of these first several cars to that portion of the train brake pipe extending through these cars from whence it flows to that portion of the train brake pipe extending through the remaining cars in the train thereby increasing the pressure in this portion of the train brake pipe which is effective to cause operation of the accelerated service valve device and the brake control valve device on each of these remaining cars to effect a quick brake release on all cars in the train and recharge of the train brake pipe.

Having now described the invention, what I claim as new and desire to secure by Letters Patent, is:

1. A locomotive fluid pressure brake apparatus comprising:
   (a) a relay valve means having an abutment subject to a control fluid pressure in a chamber at one side thereof and operable to supply a brake control pressure in accordance with variations of the pressure in said chamber,
   (b) a control valve means for varying the pressure in said chamber over a chosen range of pressures,
   (c) manually operable means having a plurality of positions for controlling the operation of said control valve means to vary the pressure in said chamber according to the position of the manually operable means,
   (d) a reservoir, and
   (e) multiposition valve means operable by said manually operable means from one position in which it establishes a communication via which fluid under pressure is supplied to charge said reservoir to establish therein a pressure substantially higher than the maximum pressure in said chosen range of pressures to another position in which said charging communication is closed and a different communication is established between said reservoir and said chamber of said relay valve means via which the pressure in the reservoir is supplied to the said chamber to effect a momentary increase of pressure therein to a value higher than the maximum of said chosen range of pressures, while said control valve means concurrently continues to regulate the pressure therein to the maximum of said chosen range of pressures, said relay valve means being operated correspondingly to establish a corresponding brake control pressure.

2. A locomotive fluid pressure brake apparatus, as claimed in claim 1, further characterized by an equalizing reservoir constantly connected to said chamber of said relay valve means, the volume of which equalizing reservoir added to that of the said chamber is effective to stabilize the operation of said relay valve means.

3. A locomotive fluid pressure brake apparatus, as claimed in claim 1, further characterized by means for manually adjusting said control valve means to vary said chosen range of pressures.

4. A locomotive fluid pressure brake apparatus, as claimed in claim 1, further characterized in that said multiposition valve means is operable by said manually operable means to a third position in which it establishes additional communications via which fluid under pressure is supplied to effect suppression of a brake application while also establishing communication via which fluid under pressure is supplied to charge said reservoir.

5. A locomotive fluid pressure brake apparatus, as claimed in claim 2, further characterized by check valve means interposed in the communication from said control valve means to said equalizing reservoir and chamber effective to prevent flow of fluid under pressure in one direction from the control valve means to the equalizing reservoir and chamber, and fluid pressure operated means for holding the check valve means unseated to enable flow therepast in both directions, and in that said multiposition valve means establishes a communication while in its said another position via which fluid under pressure may be supplied to said fluid pressure operated means to hold said check valve means unseated.

6. A locomotive fluid pressure brake apparatus, as claimed in claim 2, further characterized in that said manually operable means comprises:
   (a) a manually rotatable shaft,
   (b) a first cam fixed on said shaft for operating said control valve means, and
   (c) a second cam fixed on said shaft in spaced-apart relation to said first cam for operating said multiposition valve means,
   (d) the contours of said cams being such as to cause said control valve means to establish the maximum of said chosen range of pressures only while said multiposition valve means is in its said another position.

7. A locomotive fluid pressure brake apparatus, as claimed in claim 6, further characterized in that operation of said control valve means by progressive rotation of said first cam from a position in which said control valve means establishes the maximum of said chosen range of pressures in said chamber effects a corresponding reduction of the pressure in said chamber, and in that said multiposition valve means is correspondingly shifted from its said another position successively to the remainder of its plurality of positions in all of which fluid under pressure is supplied to charge said reservoir.

8. A locomotive fluid pressure brake apparatus comprising:
   (a) a brake pipe charged to a normal chosen pressure to effect a brake release, a reduction from which chosen pressure effects a brake application to a degree corresponding to said reduction,
   (b) a main reservoir charged with fluid at a certain high pressure,
   (c) relay valve means having an abutment subject to a control fluid pressure in a chamber at one side thereof and operable to supply fluid under pressure from said main reservoir to said brake pipe to establish therein a pressure variable in accordance with variations of the pressure in said chamber, said abutment being subject to pressure established in the brake pipe in opposition to said control fluid pressure for operating said relay valve means to lap position,
   (d) a control valve means for effecting the supply of fluid under pressure from said main reservoir to said chamber to vary the pressure therein over a chosen range of pressures the maximum of which is less than said certain high pressure,
   (e) manually operable means having a plurality of positions for controlling the operation of said control valve means to vary the pressure in said chamber over said chosen range of pressures in accordance with the position of said manually operable means,
   (f) a storage reservoir, and
   (g) multiposition valve means operable by said manually operable means from one position in which it establishes a communication between said main reservoir and said storage reservoir via which said storage reservoir is charged to the said certain high pressure in said main reservoir to another position in which said charging communication is closed and a different communication is established between said reservoir and said chamber of said relay valve means via which fluid under pressure flows from said storage reservoir to said chamber of said relay valve means to effect a momentary increase of pressure therein to a value higher than the maximum of said chosen range of pressures while said control valve means concurrently continues to regulate the pressure therein to the maximum of said chosen range of pressures, (h) said relay valve means being operated correspondingly to establish a corresponding increase of pressure in said brake pipe.

9. A locomotive fluid pressure brake apparatus, as claimed in claim 8, further characterized by an equalizing reservoir constantly connected to said chamber of said relay valve means, the volume of which equalizing reservoir added to that of said chamber is effective to stabilize the operation of said relay valve means.

10. A locomotive fluid pressure brake apparatus, as claimed in claim 8, further characterized in that the fluid under pressure supplied by said relay valve means to charge said brake pipe flows toward the rear of the train due to the pressure gradient in said brake pipe simultaneously as said control valve means reduces the said momentarily increased pressure in said chamber of said relay valve means thereby preventing said relay valve means from operating responsively to the supply of fluid under pressure to the brake pipe to release fluid under pressure from said brake pipe.

11. A locomotive fluid pressure brake apparatus, as claimed in claim 8, further characterized by choke means for controlling the rate of reduction of said momentarily increased pressure in said chamber of said relay valve means to said maximum of said chosen range of pressures.

References Cited

UNITED STATES PATENTS

| | | | |
|---|---|---|---|
| 2,424,480 | 7/1947 | McClure | 303—66 |
| 2,836,466 | 5/1958 | Cook | 303—35 |
| 2,846,273 | 8/1958 | Sexton et al. | 303—66 |

DUANE A. REGER, Primary Examiner

U.S. Cl. X.R.

303—66, 85